(12) United States Patent
Manders et al.

(10) Patent No.: US 7,282,547 B2
(45) Date of Patent: Oct. 16, 2007

(54) METHOD FOR PRODUCING AQUEOUS STYRENE-BUTADIENE POLYMER DISPERSIONS

(75) Inventors: Lambertus Manders, Ludwigshafen (DE); Thomas Wirth, Freinsheim (DE); Wolfgang Gaschler, Heidelberg (DE); Hubertus Kroener, Neustadt (DE)

(73) Assignee: BASF Aktiengesellschaft, Ludwigshafen (DE)

(*) Notice: Subject to any disclaimer, the term of this patent is extended or adjusted under 35 U.S.C. 154(b) by 238 days.

(21) Appl. No.: 10/491,271

(22) PCT Filed: Sep. 30, 2002

(86) PCT No.: PCT/EP02/10966

§ 371 (c)(1),
(2), (4) Date: Mar. 31, 2004

(87) PCT Pub. No.: WO03/029313

PCT Pub. Date: Apr. 10, 2003

(65) Prior Publication Data

US 2004/0249057 A1   Dec. 9, 2004

(30) Foreign Application Priority Data

Oct. 1, 2001  (DE) ................ 101 48 497

(51) Int. Cl.
*C08F 212/08* (2006.01)
*C08F 236/06* (2006.01)

(52) U.S. Cl. .............. 526/207; 526/87; 526/340

(58) Field of Classification Search .......... 526/87, 526/207, 340; 207/207; 340/340
See application file for complete search history.

(56) References Cited

U.S. PATENT DOCUMENTS 5,637,644 A * 6/1997 Tsuruoka et al. ........... 524/828
5,700,852 A * 12/1997 Iwanaga et al. ............ 523/201
5,703,157 A * 12/1997 Fujiwara et al. ........... 524/822

FOREIGN PATENT DOCUMENTS

| DE | 195 12 999 | 10/1995 |
|---|---|---|
| DE | 44 19 518 | 12/1995 |
| DE | 44 35 422 | 4/1996 |
| DE | 44 35 423 | 4/1996 |
| EP | 0 407 059 | 1/1991 |
| EP | 0 666 274 | 8/1995 |

OTHER PUBLICATIONS

Ullmann's Encyclopedia of Industrial Chemistry, 5th, Completely Revised Edition, on CD-ROM, Rubber, 3. Synthetic, vol. A 23, pp. 249-251. 1993.

* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

A process for preparing an aqueous styrene-butadiene polymer dispersion by free-radical aqueous emulsion polymerization of a monomer mixture M containing from 40 to 80% by weight of styrene as monomer M1, from 20 to 60% by weight of butadiene as monomer M2, and from 0 to 40% by weight, based on 100% by weight of monomers, of ethylenically unsaturated comonomers M3 other than styrene and butadiene by a monomer feed technique in the presence of from 0.05 to 0.5% by weight, based on 100% by weight of monomers, of at least one hydrocarbon HC selected from compounds having 6 to 20 carbon atoms which on abstraction of a hydrogen atom form a pentadienyl radical or a 1-phenylallyl radical and from α-methylstyrene dimer comprises supplying the monomers to be polymerized to the polymerization reaction over the course of 3 hours.

19 Claims, No Drawings

METHOD FOR PRODUCING AQUEOUS
STYRENE-BUTADIENE POLYMER
DISPERSIONS

BACKGROUND OF THE INVENTION

1. Field of the Invention

The present invention relates to a process for preparing an aqueous styrene-butadiene polymer dispersion by free-radical aqueous emulsion polymerization of a monomer mixture comprising styrene and butadiene by a monomer feed technique.

2. Description of the Background

Aqueous styrene-butadiene copolymer dispersions find diverse application, particularly as binders in coating compositions such as emulsion paints and colored paper coating slips, in barrier coatings, as a coating for the back of carpets, as an adhesive base material in carpet adhesives, in building adhesives, for modifying mortar, cement, and asphalt, for consolidating nonwovens, in sealants, in foam moldings, and as binders for leather dressing.

These dispersions are generally prepared by free-radical aqueous emulsion polymerization of monomer mixtures comprising styrene and butadiene. In the course of these processes, chain transfer agents are often used in order to prevent excessive crosslinking of the polymers, which can have an adverse effect on the performance properties of the dispersion. Such substances regulate the molecular weight of the polymer chains as they are forming, and are therefore also known as regulators.

The prior art proposes a very wide variety of different substances for use as regulators. Of commercial significance among these are compounds containing thiol groups, especially alkyl mercaptans such as n-dodecyl and tert-dodecyl mercaptan (see, for example, Ullmann's Encyclopedia of Industrial Chemistry, 5th ed. on CD-ROM, Synthetic Rubber 2.1.2). These substances are disadvantageous in a variety of respects, however; for example, because of their unpleasant odor, they are difficult to handle both before and during the polymerization. Another disadvantage is their effect on the inherent odor of the dispersions. This odor cannot be completely suppressed even by means of complex deodorization measures.

The prior art has variously proposed other regulators for the emulsion copolymerization of styrene with butadiene. In DE 195 12 999, for instance, regulators containing sulfur are used in combination with hydrocarbons such as α-methylstyrene dimer and terpinolene as regulators.

EP-A 407 059 discloses a process for the emulsion polymerization of monomer mixtures comprising styrene and butadiene, which uses mixtures of terpinolene in combination with other chain transfer agents.

It has now been found that terpinolene and other hydrocarbons which on abstraction of a hydrogen atom form a pentadienyl radical or a 1-phenylallyl radical as chain transfer agents, and also α-methylstyrene dimer alone, can be used as regulators. However, the dispersions obtained contain large amounts of organic compounds which are of low volatility and which in some cases cannot be polymerized. The amount of volatile hydrocarbons in the resulting dispersions, even following chemical deodorization of the dispersion, is generally above 3000 ppm and frequently above even 10 000 ppm. By chemical deodorization the skilled worker understands a postpolymerization process which is initiated by free radicals and carried out under forced polymerization conditions (see, for example, DE-A 44 35 423, DE-A 44 19 518, DE-A 44 35 422 and literature cited therein).

The volatile hydrocarbons are primarily a result of the hydrocarbon regulator and low molecular mass, unpolymerizable reaction products of the styrene and of the butadiene, such as ethylbenzene, 4-vinylcyclohexene, 4-phenylcyclohexene, and also unpolymerized monomers, especially styrene (i.e., residual monomer content) and unpolymerizable impurities in the feedstocks. High residual monomer contents are encountered especially when the amount of styrene in the monomer mixture to be polymerized is 40% by weight or more, and become all the more serious at styrene contents above 45% by weight, especially above 50% by weight, and in particular above 55% by weight. Although high levels of volatile constituents can sometimes be removed by subsequent physical deodorization, the expenditure, not least the expenditure in terms of time, and hence the costs, rise as the residual monomer content goes up. In particular the hydrocarbons that are used as regulators, however, can no longer be removed by conventional methods. Since, moreover, physical deodorization may have adverse consequences for the quality of the dispersion, a low level of volatile organic impurities prior to deodorization is desirable from the standpoint of quality as well.

SUMMARY OF THE INVENTION

It is an object of the present invention to provide a process for preparing aqueous styrene-butadiene polymer dispersions in the presence of the abovementioned hydrocarbon regulators, in the course of which smaller amounts of volatile constituents are formed.

We have found that this object is achieved by conducting the polymerization in accordance with a monomer feed technique in the course of which the monomers to be polymerized are supplied to the polymerization reaction over the course of 3 hours.

The present invention accordingly provides a process for preparing an aqueous styrene-butadiene polymer dispersion by free-radical aqueous emulsion polymerization of a monomer mixture M comprising from 40 to 80% by weight, preferably 50 to 79% by weight, in particular 55 to 79% by weight, of styrene as monomer M1, from 20 to 60% by weight, in particular 20 to 49% by weight, especially 20 to 44% by weight, of butadiene as monomer M2, and from 0 to 40% by weight, e.g., 1 to 40% by weight, and especially 1 to 25% by weight, based in each case on 100% by weight of monomers, of ethylenically unsaturated comonomers M3 other than styrene and butadiene.

by a monomer feed technique in the presence of from 0.05 to 0.5% by weight, in particular from 0.1 to 0.4% by weight, based on 100% by weight of monomers, of at least one hydrocarbon HC having from 6 to 20 carbon atoms, typically having from 10 to 18 carbon atoms, selected from hydrocarbons which on abstraction of a hydrogen atom form a pentadienyl or 1-phenylallyl radical and α-methylstyrene dimer, which comprises supplying the monomers to be polymerized to the polymerization reaction over the course of 3 hours.

DETAILED DESCRIPTION OF THE PREFERRED EMBODIMENTS

The process of the invention is conducted in accordance with a monomer feed technique. By this it is meant that the majority, usually at least 70%, preferably at least 80%, and in particular at least 90%, or the entirety, of the total monomers to be polymerized are supplied to the polymerization reaction under polymerization conditions. By polymerization conditions, the skilled worker understands that the polymerization reactor contains an amount of initiator which is sufficient to initiate the polymerization reaction and the reactor contents are at a temperature at which the initiator has a decomposition rate which is sufficient for initiating the polymerization. The relationships between temperature and decomposition rate are well known to the skilled worker for the common polymerization initiators, or may be determined in the course of routine experiments.

Suitable polymerization initiators include in principle all those compounds which are known to be suitable for initiating a free-radical polymerization, especially that of butadiene and styrene. Preference is given to those initiators which contain a peroxide group, such as organic and inorganic peroxides and hydroperoxides. Particular preference is given to hydrogen peroxide and the salt of peroxodisulfuric acid, e.g., sodium peroxodisulfate. Also suitable are organic hydroperoxides such as tert-butyl hydroperoxide and cumene hydroperoxide. In some cases it has been found suitable to use the aforementioned peroxides together with a reducing agent and/or a metal compound which is able to change its valence state. Suitable reducing agents are ascorbic acid, hydroxymethanesulfinic acid, the bisulfite adduct of acetone, sodium sulfite, and sodium hydrogen sulfite. Examples of suitable metal compounds are the salts and water-soluble complexes of iron, of vanadium or of copper. Very particular preference is given in the process of the invention to using peroxodisulfates such as sodium peroxodisulfate as polymerization initiators. Preferred initiators are soluble in water.

The free-radical initiator (polymerization initiator) is normally used in an amount from 0.2 to 5% by weight, in particular from 0.5 to 3% by weight, based on the monomers to be polymerized. The free-radical initiator is generally added at the rate at which it is consumed. Accordingly, it is usual to supply at least a portion or the entirety, preferably at least 50%, in particular at least 80%, of the initiator to the polymerization reaction in the course of the polymerization reaction, preferably in parallel with the addition of monomer. In particular, from 2 to 25% and with particular preference from 5 to 20% of the initiator are included in the initial charge to the reaction vessel, this initial charge is heated to the desired polymerization temperature, and the remaining amount of initiator is supplied to the polymerization reaction in parallel with the addition of monomer at a constant or variable feed rate, e.g., a climbing or falling feed rate, or at the rate at which it is consumed.

The initiator can be used either per se or as a dispersion or solution in an appropriate solvent. Suitable solvents are in principle all customary solvents which are able to dissolve the initiator. Preference is given to water and water-miscible organic solvents, e.g., $C_1$-$C_4$ alcohols, or mixtures thereof with water. In particular, the initiator is added in the form of an aqueous solution. With preference, the addition of initiator is ended together with the end of the addition of monomer or no later than 1 h, in particular no later than half an hour, after the end of the addition of monomer.

The polymerization temperature naturally depends on the decomposition characteristics of the polymerization initiator and is preferably at least 60° C., in particular at least 70° C., with particular preference at least 80° C., and with very particular preference at least 90° C. Normally, a polymerization temperature of 120° C. and preferably 110° C. will not be exceeded, so as to avoid complex pressure apparatus. With an appropriate choice of reaction vessel, however, it is also possible to employ temperatures above these levels. In the case of what is known as cold operation, i.e., when using redox initiator systems, it is even possible to carry out polymerization at relatively low temperatures, such as from 10° C. upward, for example.

In accordance with the invention, the process takes place in the presence of the above-defined hydrocarbons HC as polymerization regulators. It is of course also possible to tolerate small amounts of other compounds which are known to act as polymerization regulators. These include, for example, the abovementioned compounds containing thiol groups, e.g., alkyl mercaptans, and also the compounds specified in EP-A 407 059 and DE-A 195 12 999. Their fraction would generally amount to less than 0.1% by weight of the monomers to be polymerized and will preferably not exceed a fraction of 50 parts by weight, preferably 20 parts by weight, based on 100 parts by weight of hydrocarbon HC employed.

Suitable hydrocarbons HC, beside α-methylstyrene dimer, are all those compounds which on abstraction of a hydrogen atom form a pentadienyl or 1-phenylallyl radical. These are compounds containing either a 1,4-pentadiene structure with one or two hydrogen atoms on the C3 atom (structure A):

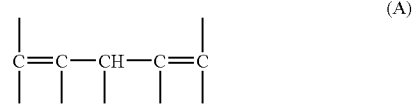

or a 1,3-pentadiene structure with one or two hydrogen atoms on the C5 atom (structure B):

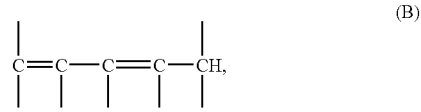

it being possible for one of the double bonds to be part of a phenyl ring. In structures A and B, the vertical lines indicate open valences, without making any statement on the stereochemistry of the double bonds. The open valences can be satisfied with hydrogen, an alkyl group or a phenyl group, or each 2 open valences may form a 5- or 6-membered carbocyclic ring. Valences on two carbon atoms connected to one another by a double bond may combine with the carbon atoms of the double bond to represent a phenyl ring.

Examples of compounds of structure A are 1,4-dihydrobenzene, γ-terpinene, terpinolene, and norbornadiene, and also α-ionone. Examples of hydrocarbons of structure B are 1,3-cyclohexadiene, α-terpinene, and α-phellandrene. The term "hydrocarbon HC" also embraces hydrocarbon ketones and hydrocarbon alcohols which eliminate water to form a structure A or B. Preferred hydrocarbon regulators are γ-terpinene, terpinolene, and α-methylstyrene dimer, especially terpinolene.

The hydrocarbon HC may be added together with the monomers or separately from them. In one embodiment of the process of the invention the entirety, or almost the entirety, of the hydrocarbon HC is supplied during the course of the polymerization. In another preferred embodiment of the process of the invention, some or all of the hydrocarbon HC, preferably at least 30%, in particular at least 50%, and with particular preference at least 80%, of the hydrocarbon HC, is included in the initial charge to the reaction vessel. By means of this measure it is possible to lower further the unwanted residual monomer content, without adversely affecting the other properties of the product.

Moreover, for reducing the level of volatile components, it has proven advantageous toward the end of the addition of monomer, when at least 70% of the monomers to be polymerized have already been supplied to the polymerization reaction, to raise the concentration of the butadiene in the monomer feed, at least temporarily, by at least 10% by weight, preferably by at least 15% by weight, e.g., by from 10 to 40% by weight, and in particular by from 15 to 30% by weight.

Concentration figures in monomer feeds, here and below, unless otherwise specified, relate to the instantaneous concentration of one component in the feed at the point in time at which it is added. Data on monomer concentrations in % by weight refer to the entirety of the monomers supplied at the point in time in question or in the time interval in question. By contrast, gross indications relate to the entirety of a component which is added over the entire duration of a feed. Unless otherwise specified, a reference to the monomer feed is to be understood as a reference to the sum of all monomer feed streams.

In general, the time interval in which the monomer feed has an increased butadiene concentration is at least 1%, and in particular at least 2%, of the total duration of the monomer feed and will preferably not exceed a duration of 20%, in particular of 10%, and will, for example, amount to from 1 to 20%, in particular from 2 to 10%, of the total duration of the monomer feed.

The concentration of butadiene in the monomer feed is preferably raised to at least 50% by weight, in particular to at least 55% by weight. Accordingly, the styrene concentration during this period will be preferably not more than 50% by weight and with particular preference not more than 45% by weight.

The change in composition of the feed takes place preferably when at least 75%, and in particular at least 80%, and preferably before 99%, in particular before 95%, and with particular preference before 90%, of the monomers to be polymerized have been supplied to the polymerization reaction.

The change in the composition in the monomer feed may take place continuously or in stages in one or more steps, e.g., in 2, 3, 4, 5 or 6 steps, to an end value or within a limited time interval which ends before the end of the addition of monomer.

The change in the composition of the monomer feed may be controlled in a variety of ways. For example, butadiene and styrene can be supplied to the polymerization reaction by way of separate monomer feed streams. Alternatively, a portion of one kind of monomer, e.g., a portion of butadiene, is supplied to the polymerization reaction by way of a feed stream which is separate from the remaining amount of the monomers. By changing the relative feed rate of the monomer feed streams it is then possible in a simple way to bring about a change in the gross composition of the monomer feed. Of course, the monomers M1 and M2 and also, where appropriate, M3 can also be supplied to the polymerization reaction by way of a common feed and the instantaneous composition of the feed can be preadjusted by means suitable mixing devices which permit continuous mixing of fluid streams. Static mixers are particularly suitable here.

In one preferred embodiment A, toward the end of the addition of monomer the supply rate of the styrene-containing monomer feed is reduced, with the rate of butadiene supplied constant, preferably such that the fraction of styrene in the monomer feed at the point in time of the end of the addition of monomer is less than 40% by weight, in particular less than 20% by weight, and especially 0% by weight. The change is preferably made when 80%, in particular from 90 to 99.5%, and with particular preference from 95 to 99%, of the monomers have been supplied. A particularly simple way of achieving this is by ending the supply of styrene before supply of butadiene has been ended, in particular when from 90 to 99.5% by weight, and with particular preference from 95 to 99% by weight, of the total butadiene polymerization have been supplied.

Conversely, with the rate of styrene addition constant, it is possible toward the end of the addition of monomer to raise the rate of butadiene supply to a final value or at least to do so within a limited time interval (embodiment B). Additionally, the two measures can be combined with one another. As far as the duration of the phase of raised butadiene supply rate is concerned, the remarks made above apply.

Particular preference is given, as a special form of embodiment B, to an embodiment B' in which a monomer mixture comprising styrene and butadiene, and monomers M3 if desired, in an approximately constant monomer composition is supplied to the polymerization reaction as monomer feed Mf1, the fraction of butadiene in the gross composition of Mf1 being reduced by from 0.5 to 20% by weight, based on the total amount of butadiene in the monomer composition to be polymerized. When at least 70%, preferably from 75 to 99%, and in particular from 80 to 95%, of the monomer feed Mf1 have been supplied to the polymerization reaction, from 0.5 to 20% by weight, preferably from 1 to 10% by weight, and in particular from 2 to 5% by weight, of butadiene, based on the total amount of the total butadiene to be polymerized, are added as a feed Mf2 in parallel with the remainder of the monomer feed Mf1 to the polymerization reaction.

Feed Mf2 will preferably contain less than 5% by weight of non-butadiene monomers M2 and/or M3. In particular, feed Mf2 contains butadiene as the sole monomer. Mf2 can be added beginning at the abovementioned point in time through to the end of the polymerization reaction, or within a short interval. The total duration of feed Mf2 is preferably from 1 to 20%, and in particular from 2 to 10%, of the total duration of Mf1. The feeds Mf1 and Mf2 are to be understood as mass flows. Mf1 and Mf2 can be introduced into the polymerization reactor by way of separate inlets. It is likewise possible to introduce the amounts of monomer corresponding to the mass flows Mf1 and Mf2 into the reactor by means of a common feed line, using appropriate mixing equipment.

The monomers may be added either in the form of a mixture of the monomers as such or else in the form of an aqueous emulsion of the monomers M1 to M3, the latter procedure generally being preferred. In embodiment B' the butadiene-rich feed Mf2 is frequently supplied to the polymerization reaction as pure monomer or monomer mixture and the feed Mf1 as an aqueous emulsion.

Where the monomers are supplied to the polymerization reaction as an aqueous emulsion, the monomer fraction is usually from 30 to 90% by weight, in particular from 40 to 80% by weight, of the total weight of the emulsion. In addition, the monomer emulsion generally includes at least part, preferably at least 70% by weight, in particular at least 80% by weight, or the entirety, of the surface-active compounds which are normally required for an emulsion polymerization.

Furthermore, it has proven advantageous to subject the reaction mixture to intensive mixing during the polymerization. Intensive mixing can be achieved, for example, by using special stirrers in conjunction with high stirring speeds, by combining stirrers with stators or by rapid circulation, e.g., pump circulation, of the reaction mixture via a bypass, it being possible for the bypass in turn to be equipped with devices for generating shear forces, e.g., solid internals such as shearing plates or perforated plates. By special stirrers are meant those stirrers which generate not only a tangential flow component but also an axial flow field. Stirrers of this kind are described, for example, in DE-A 197 11 022. Multistage stirrers are particularly preferred. Examples of special stirrers for producing tangential and axial flow components are cross-arm stirrers, MIG® and INTERMIG® stirrers (multistage impulse countercurrent stirrers and interference multistage impulse countercurrent stirrers from EKATO), axial-flow turbine stirrers, it being possible for the aforementioned stirrers to be single-stage or multistage in construction and to be combined with conventional stirrers, and, additionally, helical stirrers, preferably in close-clearance versions, coaxial stirrers, comprising an anchor-shaped close-clearance stirrer and a single-stage or multistage high-speed central stirrer, and also multiple-blade stirrers. Also suitable are types of stirrer described in DE-C1 4421949, JP-A 292002, and WO 93/22350.

Furthermore, it has proven advantageous to conduct the process of the invention such that the density of the polymer particles in the finished dispersion does not fall below a level of about $5 \times 10^{16}$ particles per kg of dispersion and is situated in particular in the range from $10^{17}$ to $3 \times 10^{19}$ particles/kg of dispersion. The particle density is dependent, of course, on the average diameter of the polymer particles in the dispersion. The average diameter of the polymer particles will preferably be below 300 nm and more preferably will be situated within the range from 50 to 200 nm. The average particle diameter is defined, as is conventional, as the weight average of the particle size as determined by means of an analytical ultracentrifuge in accordance with the method of W. Scholtan and H. Lange, Kolloid-Z. und Z. Polymere 250 (1972) pages 782 to 796, (see also W. Mächtle in "Analytical Ultracentrifugation in Biochemistry and Polymer Science", S. E. Harding et al (ed.), Cambridge: Royal Society of Chemistry, 1992, pp. 147-175). The ultracentrifuge measurement yields the integral mass distribution of the particle diameter of a sample. From this it is possible to infer what percentage by weight of the particles has a diameter equal to or less than a certain size. Similarly, the weight-average particle diameter can also be determined by dynamic or quasielastic laser light scattering (see H. Wiese in D. Distler (ed.) "Wässrige Polymerdispersionen", Wiley-VCH, Weinheim 1999, p. 40 ff. and literature cited therein). Measures for adjusting the particle density and the average particle diameter of aqueous polymer dispersions are known to the skilled worker, for example, from N. Dezelic, J. J. Petres, G. Dezelic, Kolloid-Z. u. Z. Polymere 242 (1970), pp. 1142-1150. It can be controlled both through the amount of surface-active substances and through the use of seed polymers, known as seed latices, with high emulsifier concentrations and/or high concentrations of seed polymer particles generally producing low particle diameters.

In general it proves advantageous to conduct the emulsion polymerization in the presence of one or more very finely divided polymers in the form of aqueous latices (known as seed latices). It is preferred to use from 0.1 to 5% by weight, and in particular from 0.2 to 3% by weight, of at least one seed latex (solids content of the seed latex, based on total monomer amount). Some or all of the seed latex may be supplied to the polymerization reaction together with the monomers. Preferably, however, the process takes place with seed latex included in the initial charge (initial-charge seed). The latex generally has a weight-average particle size of from 10 to 200 nm, preferably from 20 to 100 nm, and in particular from 20 to 50 nm. Examples of its constituent monomers include styrene, methyl methacrylate, n-butyl acrylate, and mixtures thereof, it being possible as well for the seed latex to contain in copolymerized form, to a minor extent, ethylenically unsaturated carboxylic acids, e.g., acrylic acid and/or methacrylic acid and/or their amides, preferably at less than 10% by weight, based on the total weight of the polymer particles in the seed latex.

When using a seed latex a procedure often followed is to include all or some of the seed latex, preferably at least 80% of it, in the initial charge to the polymerization vessel, to add some of the initiator, preferably in the fractions indicated above, and, where appropriate, some of the monomers to be polymerized, and to heat the mixture to the desired polymerization temperature. It is of course also possible to introduce the initiator and the seed latex in the opposite order. The monomers are preferably not added until polymerization conditions prevail. As well as the initiator and the seed latex, the initial charge normally includes water and, where appropriate, a portion of the surface-active compounds.

In general, a pH of 9 will not be exceeded during the polymerization. The pH is controlled in a simple way by adding a neutralizing agent in the course of the polymerization reaction. Suitable examples include bases such as alkali metal hydroxide, carbonate or hydrogen carbonate, if the pH rises during the polymerization. This is the case, for example, when using peroxodisulfates as polymerization initiators.

The polymerization reaction is frequently followed by a postpolymerization for the purpose of reducing the amount of unreacted monomers in the dispersion (referred to as residual monomers). This postpolymerization is often also termed a chemical deodorization. Chemical deodorization generally takes place by free-radical postpolymerization, especially under the action of redox initiator systems, such as are listed, for example, in DE-A 44 35 423, DE-A 44 19 518, and DE-A 44 35 422. The postpolymerization is preferably conducted with a redox initiator system composed of at least one organic peroxide and one reducing agent, preferably an inorganic sulfite or the salt of an α-hydroxy sulfone or an α-hydroxy sulfinic acid (adduct of hydrogen sulfite with carbonyl compound). The amounts of initiator for the postpolymerization are situated generally within a range of from 0.1 to 5% by weight, preferably in the range from 0.2 to 3% by weight, and in particular in the range from 0.3 to 2% by weight, based on the total monomers polymerized. In the case of initiator systems composed of a plurality of components, such as the redox initiator systems, the amounts relate to the total amount of these components.

The chemical deodorization is conducted preferably at temperatures in the range from 60 to 100° C. and in particular in the range from 70 to 95° C. The amount of initiator used for chemical deodorization may be added to the dispersion in one portion or continuously over a prolonged period at a constant or varying—e.g., increasing—feed rate. The duration of addition is then generally in the range from 10 minutes to 5 hours, and in particular in the range from 30 minutes to 4 hours. The total duration of the chemical postpolymerization is generally in the range from 15 minutes to 5 hours, and preferably in the range from 30 minutes to 4 hours.

The preparation of aqueous styrene-butadiene copolymer dispersions using terpinolene by the process of the invention gives dispersions having a much lower residual monomer content than in the prior art processes for preparing comparable dispersions. Following the chemical deodorization which is commonly carried out, dispersions can be obtained whose volatile organic compounds content is well below 10 000 ppm, preferably below 3000 ppm, in particular below 2500 ppm, and especially below 2000 ppm.

Of course, the level of volatile organic constituents can be reduced still further by known methods. This can be achieved, conventionally, by physical means, by distillative removal (especially by steam distillation) or by stripping with an inert gas, or by adsorption (see R. Racz, Macromol. Symp. 155, 2000, pp. 171-180). Following the polymerization reaction it is preferred first of all to carry out a chemical deodorization and after that a physical deodorization. Both measures may also be carried out simultaneously.

As regards the monomers M3 there are in principle no restrictions in the process of the invention. Rather, the nature and amount of the monomers M3 is guided primarily by the intended use. Examples of suitable monomers M3 are:

monoethylenically unsaturated, acid-functional monomers such as monocarboxylic and dicarboxylic acids having from 3 to 10 carbon atoms such as acrylic acid, methacrylic acid, crotonic acid, acrylamidoglycolic acid, vinylacetic acid, maleic acid, itaconic acid, and the monoesters of maleic acid with $C_1$-$C_4$ alkanols, ethylenically unsaturated sulfonic acids such as vinylsulfonic acid, allylsulfonic acid, styrenesulfonic acid, 2-acrylamidomethylpropanesulfonic acid, and ethylenically unsaturated phosphonic acids, such as vinylphosphonic acid, allylphosphonic acid, styrenephosphonic acid and 2-acrylamido-2-methylpropanephosphonic acid, and their water-soluble salts, their alkali metal salts, for example; preferably acrylic acid and methacrylic acid. Monomers of this kind may be present among the monomers M in an amount of up to 10% by weight, e.g. from 0.1 to 10% by weight, preferably from 0.1 to 4% by weight;

amides of monoethylenically unsaturated carboxylic acids, such as acrylamide and methacrylamide, and also the N-(hydroxy-$C_1$-$C_4$-alkyl)amides, preferably the N-methylolamides of ethylenically unsaturated carboxylic acids, such as N-methylolacrylamide and N-methylolmethacrylamide. Monomers of this kind may be present among the monomers M in an amount of up to 10% by weight, e.g. from 0.1 to 10% by weight, preferably from 0.1 to 4% by weight;

hydroxyalkyl esters of monoethylenically unsaturated carboxylic acids, especially hydroxyethyl, hydroxypropyl, and hydroxybutyl esters, e.g. hydroxyethyl acrylate, hydroxypropyl acrylate, hydroxyethyl methacrylate, and hydroxypropyl methacrylate. Monomers of this kind may be present among the monomers M in an amount of up to 10% by weight, e.g., from 0.1 to 10% by weight, preferably from 0.5 to 5% by weight;

ethylenically unsaturated nitriles having preferably from 3 to 10 carbon atoms, such as acrylonitrile and methacrylonitrile. Monomers of this kind may be present among the monomers M in an amount of up to 30% by weight, e.g., from 1 to 30% by weight, preferably from 5 to 20% by weight;

reactive monomers: the reactive monomers include those which have a reactive functionality that is suitable for crosslinking. In addition to the abovementioned ethylenically unsaturated carboxylic acids, their N-alkylolamides, and hydroxyalkyl esters, these include monomers which contain a carbonyl group or epoxy group, examples being N-diacetoneacrylamide, N-diacetonemethacrylamide, acetylacetoxyethyl acrylate, and acetylacetoxyethyl methacrylate, glycidyl acrylate, and glycidyl methacrylate. Monomers of this kind may be present among the monomers M in an amount of up to 10% by weight, e.g., from 0.5 to 10% by weight; and crosslinking monomers: the crosslinking monomers include those which have at least two nonconjugated ethylenically unsaturated bonds, e.g., the di- and triacrylates and -methacrylates of difunctional and trifunctional alcohols, e.g., ethylene glycol diacrylate, diethylene glycol diacrylate, triethylene glycol diacrylate, butanediol diacrylate, hexanediol diacrylate, trimethylolpropane triacrylate, and tripropylene glycol diacrylate. Monomers of this kind may be present among the monomers M in an amount of up to 2% by weight, preferably not more than 1% by weight, e.g., from 0.01 to 2% by weight, preferably from 0.01 to 1% by weight. In one preferred embodiment the monomers M contain no crosslinking monomer.

Preferred monomers (monomers M3') are the monoethylenically unsaturated monocarboxylic and dicarboxylic acids having from 3 to 10 carbon atoms, their amides, their $C_2$-$C_4$ hydroxyalkyl esters, their N-(hydroxy-$C_1$-$C_4$ alkyl) amides and the above-mentioned ethylenically unsaturated nitriles. Particularly preferred comonomers are the monoethylenically unsaturated monocarboxylic and dicarboxylic acids, especially acrylic acid, methacrylic acid, and itaconic acid.

In one particularly preferred embodiment of the process of the invention the mixture of monomers M to be polymerized comprises from 55 to 70% by weight of styrene,
from 29 to 44% by weight of butadiene, and
from 1 to 10% by weight of at lest one monomer M3, preferably at least one monomer M3', and in particular an ethylenically unsaturated monocarboxylic or dicarboxylic acid.

In another preferred embodiment of this process, some of the styrene, preferably from 5 to 20% by weight, based on the total monomer amount, is replaced by acrylonitrile and/or methacrylonitrile. In this preferred embodiment the mixture to be polymerized comprises, for example, from 30 to 65% by weight of styrene,
from 29 to 44% by weight of butadiene,
from 5 to 25% by weight of acrylonitrile and/or methacrylonitrile, and
from 1 to 10% by weight of an ethylenically unsaturated monocarboxylic or dicarboxylic acid.

In the light of the use of the polymers prepared by the process of the invention as binders in coating compositions, e.g., in colored paper coating slips or in paints, it has proven advantageous if the polymer resulting from the polymerization has a glass transition temperature in the range from −20 to +50° C. and preferably in the range from 0 to 30° C. The glass transition temperature here is the midpoint temperature which can be determined in accordance with ASTM 3418-82 by means of DSC.

The glass transition temperature can be controlled in a known way through the monomer mixture M employed.

According to Fox (T. G. Fox, Bull. Am. Phys. Soc. (Ser. II) 1, 123 [1956] and Ullmanns Encyklopädie der Technischen Chemie, Weinheim (1980), pp. 17, 18) the glass transition temperature of copolymers at high molar masses is given in good approximation by $$\frac{1}{T_g} = \frac{x^1}{T_g^1} + \frac{x^2}{T_g^2} + \ldots \frac{x^n}{T_g^n}$$

where $X^1, X^2, \ldots, X^n$ are the mass fractions of the monomers $1, 2, \ldots, n$ and $T_g^1, T_g^2, \ldots, T_g^n$ are the glass transition temperatures of the polymers constructed in each case from only one of the monomers $1, 2, \ldots, n$, in degrees Kelvin. These temperatures are known, for example, from Ullmann's Encyclopedia of Industrial Chemistry, VCH, Weinheim, Vol. A 21 (1992) p. 169 or from J. Brandrup, E. H. Immergut, Polymer Handbook 3$^{rd}$ ed., J. Wiley, New York 1989. Accordingly, polystyrene possesses a $T_g$ of 380 K and polybutadiene a $T_g$ of 171 K or 166 K.

The examples which follow are intended to illustrate the invention but without restricting it.

The particle size of the polymer was determined by light scattering in accordance with ISO 13321 using a Malvern autosizer 2C on samples with a concentration of 0.01% by weight. The light transmittance was determined on samples with a concentration of 0.01% by weight at a cuvette length of 2.5 cm against pure water as reference. The glass transition temperature was determined by means of DSC by the midpoint method.

Residual volatile fractions were determined by gas-chromatographic analysis.

EXAMPLE 1

A polymerization vessel was charged with 360 g of water, 91 g of a 33% by weight polymer seed (polystyrene latex, $d_{50}$ 30 nm) and 10% of the initiator solution (feed stream 2) and this initial charge was heated to 95° C.

Then the remainder of the monomer emulsion and the remainder of the initiator solution were added to the polymerization vessel by way of two separate feeds, beginning simultaneously, over the course of 2.5 hours, during which the temperature was maintained. After the end of the addition of monomer, the mixture was cooled to 90° C. and then an aqueous solution of 8.5 g of tert-butyl hydroperoxide in 90 g of water, and also a solution of 3.9 g of acetone and 15.7 g of a 40% strength by weight aqueous sodium disulfite solution in 84 g of water were added, beginning simultaneously, over the course of 2 hours, during which the temperature was maintained. Thereafter, 24.6 g of 25% strength by weight sodium hydroxide solution were added and the batch was cooled to room temperature.

Feed stream 1:

540.0 g deionized water 33.6 g emulsifier solution 4.7 g terpinolene (95% by weight)

950.0 g styrene 495.0 g butadiene 45.0 g acrylic acid 12.0 g 25% strength by weight aqueous sodium hydroxide Feed stream 2:

15.0 g sodium peroxodisulfate in 230 g water

Emulsifier solution: mixture of 3 parts by weight of an aqueous 45% strength by weight solution of the sodium salt of disulfonated monododecyldiphenyl ether (DOWFAX 2A1, Dow Chemical) and 7 parts by weight of aqueous 15% strength by weight sodium dodecyl sulfate solution The solids content of the dispersion was about 52% by weight. The light transmittance was 73%. The weight-average particle size $d_{50}$ was 122 nm. The pH was 6.3 and the glass transition temperature $T_g$ was 27° C.

EXAMPLE 2

A polymerization vessel was charged with 360 g of water, 91 g of a 33% by weight polymer seed (polystyrene latex, $d_{50}$ 30 nm) and 10% of the initiator solution (feed stream 2) and this initial charge was heated to 95° C.

Then the remainder of the monomer emulsion and the remainder of the initiator solution were added to the polymerization vessel by way of two separate feeds, beginning simultaneously, over the course of 2.5 hours, during which the temperature was maintained. 2 hours after the beginning of feed stream 1, 30 g of butadiene were added to the reaction vessel over the course of 5 minutes. After the end of the addition of monomer, the mixture was cooled to 90° C. and then an aqueous solution of 8.5 g of tert-butyl hydroperoxide in 90 g of water, and also a solution of 3.9 g of acetone and 15.7 g of a 40% strength by weight aqueous sodium disulfite solution in 84 g of water were added, beginning simultaneously, over the course of 2 hours, during which the temperature was maintained. Thereafter, 17 g of 25% strength by weight sodium hydroxide solution were added and the batch was cooled to room temperature.

Feed stream 1:

540.0 g deionized water 36.6 g emulsifier solution 5.0 g terpinolene (90% by weight)

950.0 g styrene 495.0 g butadiene 45.0 g acrylic acid 12.0 g 25% strength by weight aqueous sodium hydroxide Feed stream 2:

15 g sodium peroxodisulfate in 250 g water

Emulsifier solution: mixture of 4 parts by weight of an aqueous 45% strength by weight solution of the sodium salt of disulfonated monododecyldiphenyl ether (DOWFAX 2A1, Dow Chemical) and 6 parts by weight of aqueous 15% strength by weight sodium dodecyl sulfate solution The solids content of the dispersion was about 50% by weight. The light transmittance was 72%. The weight-average particle size $d_{50}$ was 121 nm. The pH was 5.8 and the glass transition temperature $T_g$ was 26° C.

EXAMPLE 3

In the manner indicated in Example 1, under otherwise identical conditions, the following monomer emulsion (feed stream 1) was polymerized.

Feed stream 1:

540.0 g deionized water 36.6 g emulsifier solution (see Example 2)

4.2 g terpinolene (90% by weight)

950.0 g styrene 495.0 g butadiene 45.0 g acrylic acid 12.0 g 25% strength by weight aqueous sodium hydroxide The solids content of the dispersion was about 56% by weight. The light transmittance was 73%. The weight-average particle size $d_{50}$ was 116 nm. The pH was 5.6 and the glass transition temperature $T_g$ was 27° C.

EXAMPLE 4

In the manner indicated in Example 2, under otherwise identical conditions, the following monomer emulsion (feed stream 1) was polymerized:

Feed stream 1:

540.0 g deionized water 36.6 g emulsifier solution (as in Example 2)

4.2 g terpinolene (90% by weight)

950.0 g styrene 495.0 g butadiene 45.0 g acrylic acid 12.0 g 25% strength by weight aqueous sodium hydroxide The solids content of the dispersion was about 52% by weight. The light transmittance was 70%. The weight-average particle size $d_{50}$ was 126 nm. The pH was 5.6 and the glass transition temperature $T_g$ was 28° C.

EXAMPLE 5

A polymerization vessel was charged with 330 g of water, 180 g of a 33% by weight polymer seed (polystyrene latex, $d_{50}$ 30 nm) and 10% of the initiator solution (feed stream 2) and this initial charge was heated to 90° C.

Then the remainder of the monomer emulsion and the remainder of the initiator solution were added to the polymerization vessel by way of two separate feeds, beginning simultaneously, over the course of 3 hours, during which the temperature was maintained. After the end of the addition of monomer, the mixture was cooled to 85° C. and then an aqueous solution of 8.5 g of tert-butyl hydroperoxide in 90 g of water, and also a solution of 3.9 g of acetone and 15.7 g of a 40% strength by weight aqueous sodium disulfite solution in 84 g of water were added, beginning simultaneously, over the course of 2 hours, during which the temperature was maintained. Thereafter, 24.6 g of 25% strength by weight sodium hydroxide solution were added and the batch was cooled to room temperature.

Feed stream 1:

540.0 g deionized water 36.6 g emulsifier solution (see Example 1)

5.0 g terpinolene (90% by weight)

800.0 g styrene 640.0 g butadiene 45.0 g acrylic acid 12.0 g 25% strength by weight aqueous sodium hydroxide Feed stream 2:

15 g sodium peroxodisulfate in 210 g water

The solids content of the dispersion was about 52% by weight. The light transmittance was 83%. The weight-average particle size $d_{50}$ was 107 nm. The pH was 5.7 and the glass transition temperature $T_g$ was 6° C.

EXAMPLE 6

The procedure of Example 5 was repeated but adding monomer feed stream 1 to the polymerization reactor over the course of 2.5 hours.

The solids content of the dispersion was about 52% by weight. The light transmittance was 83%. The weight-average particle size $d_{50}$ was 107 nm. The pH was 5.7 and the glass transition temperature $T_g$ was 6° C.

EXAMPLE 7

A polymerization vessel was charged with 360 g of water, 91 g of a 33% by weight polymer seed (polystyrene latex, $d_{50}$ 30 nm), 3.2 g of terpinolene, and 10% of the initiator solution (feed stream 2) and this initial charge was heated to 90° C.

Then the remainder of the monomer emulsion and the remainder of the initiator solution were added to the polymerization vessel by way of two separate feeds, beginning simultaneously, over the course of 2.5 hours, during which the temperature was maintained. Additionally, 2 hours after the beginning of the feed, 30 g of butadiene were added to the reaction vessel over the course of 5 minutes. After the end of the addition of monomer, the mixture was cooled to 85° C. and then an aqueous solution of 8.5 g of tert-butyl hydroperoxide in 90 g of water, and also a solution of 3.9 g of acetone and 15.7 g of a 40% strength by weight aqueous sodium disulfite solution in 84 g of water were added, beginning simultaneously, over the course of 2 hours, during which the temperature was maintained. Thereafter, 24.6 g of 25% strength by weight sodium hydroxide solution were added and the batch was cooled to room temperature.

Feed stream 1:

540.0 g deionized water 36.6 g emulsifier solution (see Example 1)

800.0 g styrene 615.0 g butadiene 45.0 g acrylic acid 12.0 g 25% strength by weight aqueous sodium hydroxide Feed stream 2:

15 g sodium peroxodisulfate in 210 g water

The solids content of the dispersion was about 50% by weight. The light transmittance was 73%. The weight-average particle size $d_{50}$ was 123 nm. The pH was 5.5 and the glass transition temperature $T_g$ was 7° C.

COMPARATIVE EXAMPLE CE 1

A polymerization vessel was charged with 330 g of water, 180 g of a 33% by weight polymer seed (polystyrene latex, $d_{50}$ 30 nm), and 10% of the initiator solution (feed stream 2) and this initial charge was heated to 85° C.

Then the remainder of the monomer emulsion and the remainder of the initiator solution were added to the polymerization vessel by way of two separate feeds, beginning simultaneously, over the course of 6 hours, during which the temperature was maintained. After the end of the addition of monomer, the mixture was cooled to 70° C. and then an aqueous solution of 8.5 g of tert-butyl hydroperoxide in 90 g of water, and also a solution of 3.9 g of acetone and 15.7 g of a 40% strength by weight aqueous sodium disulfite solution in 84 g of water were added, beginning simultaneously, over the course of 2 hours, during which the temperature was maintained. Thereafter, 24.6 g of 25% strength by weight sodium hydroxide solution were added and the batch was cooled to room temperature.

Feed stream 1:

540.0 g deionized water 36.6 g emulsifier solution (see Example 1)

5.0 g terpinolene 800.0 g styrene 645.0 g butadiene 45.0 g acrylic acid 12.0 g 25% strength by weight aqueous sodium hydroxide Feed stream 2:

15 g sodium peroxodisulfate in 210 g water

The solids content of the dispersion was about 50% by weight. The light transmittance was 82%. The weight-average particle size $d_{50}$ was 104 nm. The pH was 6.3 and the glass transition temperature $T_g$ was 5° C.

COMPARATIVE EXAMPLE CE 2

A polymerization vessel was charged with 330 g of water, 180 g of a 33% by weight polymer seed (polystyrene latex, $d_{50}$ 30 nm), and 10% of the initiator solution (feed stream 2) and this initial charge was heated to 85° C.

Then the remainder of the monomer emulsion and the remainder of the initiator solution were added to the polymerization vessel by way of two separate feeds, beginning simultaneously, over the course of 6 hours, during which the temperature was maintained. Additionally, 5.5 hours after the beginning of the feed, 30 g of butadiene were added to the reaction vessel over the course of 5 minutes. After the end of the addition of monomer, the mixture was cooled to 85° C. and then an aqueous solution of 8.5 g of tert-butyl hydroperoxide in 90 g of water, and also a solution of 3.9 g of acetone and 15.7 g of a 40% strength by weight aqueous sodium disulfite solution in 84 g of water were added, beginning simultaneously, over the course of 2 hours, during which the temperature was maintained. Thereafter, 24.6 g of 25% strength by weight sodium hydroxide solution were added and the batch was cooled to room temperature.

Monomer feed, initiator feed, and emulsifier solution were identical with those of Example 5.

The solids content of the dispersion was about 49.9% by weight.

The light transmittance was 80.3%. The weight-average particle size $d_{50}$ was 106 nm. The pH was 5.9 and the glass transition temperature $T_g$ was 6° C.

COMPARATIVE EXAMPLE CE 3

A polymerization vessel was charged with 330 g of water, 180 g of a 33% by weight polymer seed (polystyrene latex, $d_{50}$ 30 nm), 5.0 g of terpinolene (90% by weight) and 10% of the initiator solution (feed stream 2) and this initial charge was heated to 85° C.

Then the remainder of the monomer emulsion and the remainder of the initiator solution were added to the polymerization vessel by way of two separate feeds, beginning simultaneously, over the course of 6 hours, during which the temperature was maintained. After the end of the addition of monomer, the mixture was cooled to 70° C. and then an aqueous solution of 8.5 g of tert-butyl hydroperoxide in 90 g of water, and also a solution of 3.9 g of acetone and 15.7 g of a 40% strength by weight aqueous sodium disulfite solution in 84 g of water were added, beginning simultaneously, over the course of 2 hours, during which the temperature was maintained. Thereafter, 24.6 g of 25% strength by weight sodium hydroxide solution were added and the batch was cooled to room temperature.

Feed stream 1:

540.0 g deionized water 36.6 g emulsifier solution (see Example 1)

800.0 g styrene 640.0 g butadiene 45.0 g acrylic acid 12.0 g 25% strength by weight aqueous sodium hydroxide Feed stream 2:

15 g sodium peroxodisulfate in 210 g water

The solids content of the dispersion was about 50.7% by weight. The light transmittance was 81.1%. The weight-average particle size $d_{50}$ was 103 nm. The pH was 6.1 and the glass transition temperature $T_g$ was 5° C.

TABLE 1

Fractions of volatile organic components in the resulting dispersions before physical deodorization (in ppm, based on the total weight of the dispersion):

| Example | 1 | 2 | 3 | 4 | 5 |
|---|---|---|---|---|---|
| Butadiene | 20 | 80 | 50 | 80 | 40 |
| VCH | 220 | 70 | 180 | 270 | 140 |
| Ethylbenzene | 20 | 10 | 20 | 20 | 40 |
| Styrene | 2500 | 900 | 1600 | 690 | 2400 |
| PCH | 40 | 30 | 50 | 30 | 80 |
| Terpinolene | 440 | 470 | 390 | 400 | 450 |
| Σ | 3240 | 1560 | 2290 | 1490 | 3150 |

| Example | 6 | 7 | CE 1 | CE 2 | CE 3 |
|---|---|---|---|---|---|
| Butadiene | 40 | <10 | 30 | 80 | 40 |
| VCH | 130 | 70 | 80 | 70 | 60 |
| Ethylbenzene | 20 | 20 | 20 | 20 | 20 |
| Styrene | 1400 | 330 | 3890 | 2700 | 2900 |
| PCH | 100 | 40 | 60 | 40 | 50 |

TABLE 1-continued

Fractions of volatile organic components in the resulting dispersions before physical deodorization (in ppm, based on the total weight of the dispersion):

| Terpinolene | 460 | 170 | 460 | 440 | 260 |
|---|---|---|---|---|---|
| Σ | 1250 | 640 | 4540 | 3350 | 3330 |

We claim:

1. A process for preparing an aqueous styrene-butadiene polymer dispersion, comprising:
   polymerizing, in an aqueous emulsion containing a free radical initiator, by a monomer feed technique, in a polymerization vessel a monomer mixture comprising
   from 40 to 80% by weight of styrene as monomer M1,
   from 20 to 60% by weight of butadiene as monomer M2, and
   from 0 to 40% by weight, based on 100% by weight of monomers, of ethylenically unsaturated comonomers M3 other than styrene and butadiene,
   the emulsion also containing from 0.05 to 0.5% by weight, based on 100% by weight of monomers, of at least one hydrocarbon compound selected from the group consisting of compounds having from 6 to 20 carbon atoms, which upon abstraction of a hydrogen atom form a pentadienyl or 1-phenylallyl radical, and α-methylstyrene dimer, said monomer mixture being supplied to the polymerization reaction medium over the course of and within a period of 3 hours.

2. The process as claimed in claim 1, wherein at least 30% of the hydrocarbon is present in the initial charge to the polymerization vessel and the remainder of the hydrocarbon is supplied to the polymerization reaction during said course of time.

3. The process as claimed in claim 1, wherein the hydrocarbon is selected from the group consisting of terpinolene, γ-terpinene and α-methylstyrene dimer.

4. The process as claimed in claim 1, wherein the polymerization initiator is selected from the group consisting of organic and inorganic compounds containing a peroxide group.

5. The process as claimed in claim 1, wherein the polymerization reaction is conducted in the presence of from 0.1 to 10% by weight of at least one seed latex.

6. The process as claimed in claim 1, wherein at a time when at least 70% of the monomers to be polymerized have been supplied to the polymerization reaction the concentration of butadiene in the monomer feed is raised for a period of at least 1% of the total feed duration by at least 10% by weight, based on monomers in the feed.

7. The process as claimed in claim 6, wherein the concentration of the butadiene in the monomer feed is raised in said period to at least 50% by weight.

8. The process as claimed in claim 6, wherein a monomer mixture comprising styrene, butadiene, and optional monomers M3 is supplied to the polymerization reaction as a styrene monomer feed, and when at least 70% of the styrene monomer feed has been supplied to the polymerization reaction, from 0.5 to 20% by weight of butadiene, based on the total amount of butadiene to be polymerized, is supplied to the polymerization reaction as a butadiene feed in parallel to the styrene monomer feed.

9. The process as claimed in claim 8, wherein the total butadiene feed is supplied within a time interval which ranges from 1 to 20% of the duration of said styrene monomer feed.

10. The process as claimed in claim 6, wherein the weight fraction of styrene in the monomer feed at the time when the supply of monomer to the polymerization reactor is ended is less than 20% by weight.

11. The process as claimed in claim 10, wherein the supply of styrene to the polymerization reactor is ended before the supply of butadiene is ended.

12. The process as claimed in claim 1, wherein said optional monomers are selected from the group consisting of monoethylenically unsaturated monocarboxylic and dicarboxylic acids having from 3 to 10 carbon atoms, their amides, their $C_2$-$C_4$ hydroxyalkyl esters, their N-(hydroxy-$C_1$-$C_4$ alkyl)amides and ethylenically unsaturated nitriles.

13. The process as claimed in claim 1, wherein the monomer mixture to be polymerized comprises
   from 55 to 70% by weight of styrene,
   from 29 to 44% by weight of butadiene, and
   from 1 to 10% by weight of at least one of said ethylenically unsaturated comonomers M3.

14. The process as claimed in claim 8, wherein, when from 75 to 99% of the styrene monomer feed has been supplied to the polymerization reaction, from 15 to 10% by weight of butadiene, based on the total amount of butadiene to be polymerized, is supplied to the polymerization reaction.

15. A method, comprising:
   polymerizing, in an aqueous emulsion containing a free radical initiator, by a monomer feed technique in a polymerization vessel, a monomer mixture comprising
   from 40 to 80% by weight of styrene,
   from 20 to 60% by weight of butadiene, and
   from 0 to 40% by weight, based on 100% by weight of monomers, of ethylenically unsaturated comonomers other than styrene and butadiene,
   the emulsion also containing from 0.05 to 0.5% by weight, based on 100% by weight of monomers, of at least one hydrocarbon compound selected from the group consisting of compounds having from 6 to 20 carbon atoms, which upon abstraction of a hydrogen atom form a pentadienyl or 1-phenylallyl radical and α-methylstyrene dimer, said monomer mixture being supplied to the polymerization reaction medium within a period of 3 hours, thereby preparing an aqueous styrene-butadiene polymer dispersion in which the residual amounts of volatiles in the polymer dispersion are reduced.

16. The process as claimed in claim 1, wherein at least 80% of the monomer mixture that is to be polymerized is fed into the polymerization vessel after polymerization of monomer in the vessel has commenced.

17. The process as claimed in claim 1, wherein at least 90% of the monomer mixture that is to be polymerized is fed into the polymerization vessel after polymerization of monomer in the vessel has commenced.

18. The process of claim 1, wherein the polymerization is performed in the presence of less than 0.1% by weight, based on monomers to be polymerized, of a polymerization regulator which is different from the hydrocarbon compound.

19. The process of claim 1, wherein the material initially charged to the polymerization vessel contains none of the monomer mixture, and the entirety of the monomer mixture is added to the polymerization vessel under polymerization conditions.

* * * * *

UNITED STATES PATENT AND TRADEMARK OFFICE
CERTIFICATE OF CORRECTION

| | |
|---|---|
| PATENT NO. | : 7,282,547 B2 |
| APPLICATION NO. | : 10/491271 |
| DATED | : October 16, 2007 |
| INVENTOR(S) | : Manders et al. |

Page 1 of 1

It is certified that error appears in the above-identified patent and that said Letters Patent is hereby corrected as shown below:

On the title page, the Terminal Disclaimer information has been omitted. Item (45) and the Notice information should read as follows:

Item -- (45) **Date of Patent: *Oct. 16, 2007**

Item (*) Notice: Subject to any disclaimer, the term of this patent is extended or adjusted under 35 U.S.C. 154(b) by 238 days.

This patent is subject to a terminal disclaimer. --

Signed and Sealed this

Eighteenth Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,282,547 B2
APPLICATION NO. : 10/491271
DATED : October 16, 2007
INVENTOR(S) : Lambertus Manders et al.

It is certified that error appears in the above-identified patent and that said Letters Patent is hereby corrected as shown below:

Column 18, line 13, "$C_1$-$C_4$ alkyl)amides and ethylenically unsaturated nitrites" should read
--$C_1$-$C_4$ alkyl)amides and ethylenically unsaturated nitriles--

Signed and Sealed this

Twenty-sixth Day of August, 2008

JON W. DUDAS
*Director of the United States Patent and Trademark Office*